No. 655,676. Patented Aug. 7, 1900.
J. A. BROWN.
PORTABLE CONVEYER.
(Application filed July 11, 1899.)
(No Model.) 2 Sheets—Sheet 1.
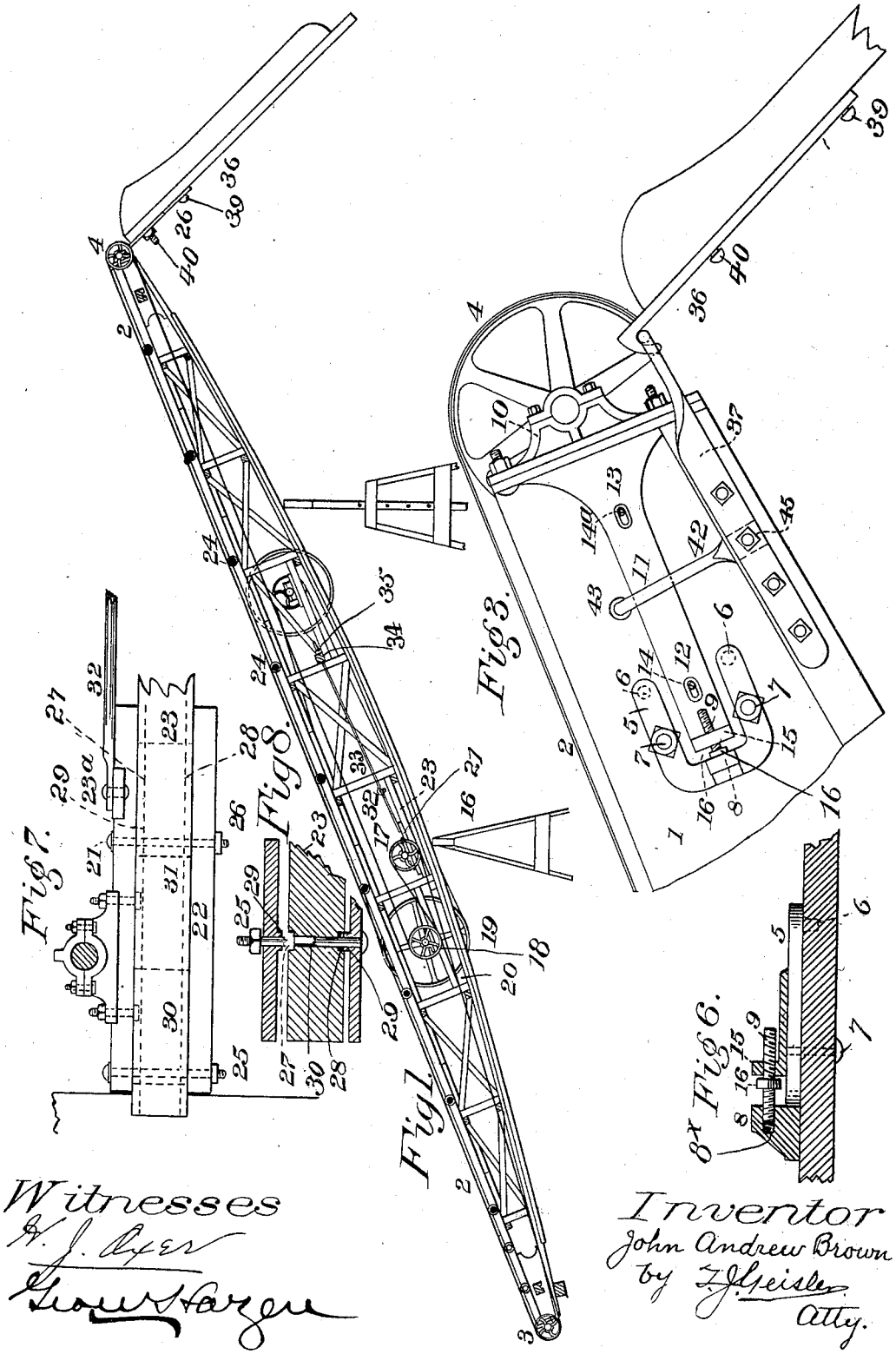
Witnesses
Inventor
John Andrew Brown
by F. J. Geisler
Atty.

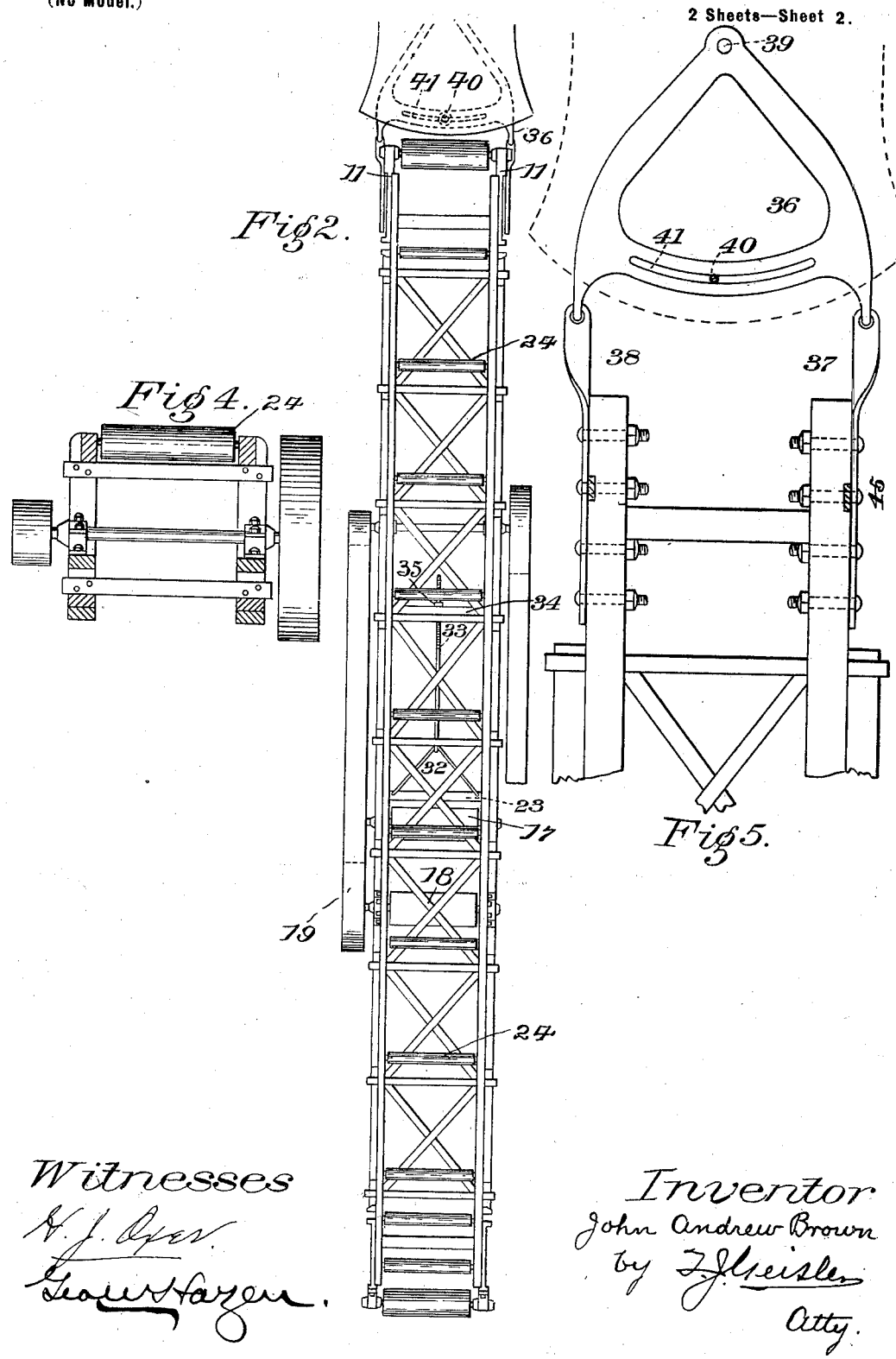

UNITED STATES PATENT OFFICE.

JOHN ANDREW BROWN, OF PORTLAND, OREGON.

PORTABLE CONVEYER.

SPECIFICATION forming part of Letters Patent No. 655,676, dated August 7, 1900.

Application filed July 11, 1899. Serial No. 723,495. (No model.)

*To all whom it may concern:*

Be it known that I, JOHN ANDREW BROWN, a citizen of the United States, and a resident of Portland, Multnomah county, State of Oregon, have invented certain new and useful Improvements in Portable Conveyers, of which the following is a specification, reference being had to the accompanying drawings, forming a part thereof.

My invention relates to portable conveyers for conveying wheat and flour in sacks from the wharf over the ship's side.

The object of my invention is to obtain a portable trestle-like frame resting on portable supports and carrying an endless traveling belt upon which the sacks are placed and whereby the same are carried up to the ship's side. From the upper end of the conveyer a delivering-chute is suspended, dropping the sacks into the hold of the ship, such chute to be adapted to allow for some motion of the vessel, as would result, for example, from the swell occasioned by a passing steamer.

I carry my invention into effect as illustrated in the accompanying drawings, in which—

Figure 1 is a side elevation showing my conveyer as if in position for loading a vessel. Fig. 2 is a plan of my conveyer. Fig. 3 is an enlarged partial elevation of the upper end of the conveyer, this figure illustrating the means for alining the shafts of the upper and lower end drums so as to square the belt and keep the same in place on such drums. Fig. 4 is a cross-section, somewhat enlarged, of that part of my conveyer opposite to which it is placed. Fig. 5 is a partial plan of the upper end of the frame of my conveyer, illustrating the construction of the devices employed by me for suspending the upper end of the chute from the head of my conveyer, allowing for any forward and backward motion of the ship due to causes mentioned. The chute is suspended, as apparent, by contrivances constituting a universal joint. Fig. 6 is a partial vertical longitudinal section through the center of Fig. 3. Fig. 7 is a partial enlarged elevation of the longitudinally-adjustable bearings for the shaft of the tightening-drum, and Fig. 8 is a cross-section through one of the girths supporting such adjustable bearings.

The reference-numerals designate the parts referred to.

My conveyer comprises a frame on which travels an endless belt. At the two ends of the frame are drums, each journaled in adjustable bearings, enabling the accurate adjustment of the shafts of said drums at right angles to the frame. The object of so adjusting the said shafts is to square the belt and keep the same in place. An enlarged detail of the construction of said adjustable bearings is shown in Fig. 3. The same comprise U-shaped irons 5, rigidly attached to the sides of the frame, such sides at the ends of the frame being made of strong planks. The U-shaped irons 5 have dowels 6, which are inserted in cavities therefor provided in said sides, so as to afford stability, and the said irons are secured by screw-bolts 7. The central portions of the U-irons have protruding lugs 8, tapped and rigidly holding screws 9. The latter enter threaded openings $8^\times$ in the lugs 8.

The boxes 10 for the end drums are respectively fixed to arms 11, slidably attached to the sides of the frame, having slots 12 13, in which are inserted screw-bolts 14 $14^a$, extending through the casing of the frame. The rear end of said arms have protruding lugs 15, which are perforated and through which extend the screws 9, and nuts 16 on the screws 9, bearing against the lugs 15, furnish the means for alining the said shafts. The required adjustment is very little. The slots 12 13 in the arms allow a play of about half an inch. The endless belt holds the said adjustable bearings for the end drums upon their seats as adjusted. The adjustment of the end drums only becomes necessary when the belt has become unevenly stretched because of atmospheric conditions or use. Normally the soles of the boxes holding the shafts of said end drums rest against the ends of the frame. The upper end of the belt is supported by and travels over a series of carrier-rollers 24, journaled crosswise in boxes affixed on the interior of the frame. The return end of the belt passes over a tightening-drum 17, thence back and around a driving-drum 18, fixed on the shaft of the driving-pulley 19. The boxes for the shaft of the driving pulley and drum thereon are fixedly mounted on longitudinal girths 20, while the boxes for the shaft of the tightening-drum 17 are movably mounted on girths 23, being carried on a sliding carriage composed of shoes 21 22, sliding against the upper and under sides of the said girths, the upper pair of said shoes being connected by a brace 23ᵃ and said shoes being held on said girths by means of tie-bolts 25 26. The girths 23 have vertical longitudinal grooves 27 28 in their upper and under sides, and the inner faces of the upper and lower shoes have tongues, as 29, sliding in such slots and holding the shoes against lateral displacement. The bolts 25 26 extend through slots 30 31, cut for that purpose vertically in the girths 23. Attached to the said carriage is a stirrup 32, connected to a rod 33, having a threaded end projecting through a perforation in the cross-tie 34, and a nut 35 enables the shortening of the rod 33 and therewith moving the position of the carriage holding the tightening-drum 17 forward. This provides the means for tightening the belt to take up the slack and compensate for stretching.

The frame itself is constructed like a trestle and may be built of wood or iron, suitable bracing being disposed throughout the frame to afford sufficient strength.

The conveyer is supported on one or more portable horses or trestles, as shown in Fig. 2. From the upper end of the conveyer is suspended a chute for discharging the elevated sacks into the hold of the ship. To allow for any forward or backward movement of the ship while loading the same, the chute, as mentioned, is suspended from the top of the conveyer by a universal joint. Such suspension contrivance consists of a bail 36, hung from ears in straps 37 38, affixed to the head of the conveyer, such bail being fastened at its heel to the chute by means of a pivot-bolt 39 and a bolt 40, projecting through a slot 41 in the upper part of said bail, also holding the bail to upper end of said chute, but allowing said end to swivel on the bolt 39, so that the chute may adapt itself to the forward and backward movement of the ship, as mentioned. As there will be considerable downward strain of the chute on the ear-straps 37 38, I use suspension-braces 42 for upholding such straps, the upper ends of such braces being bent and their extremities threaded. Collars 43 are provided to brace against the casing, and a nut on said threaded extremities rigidly holding the threaded ends of the braces, and the lower ends of such braces are engaged by one of the bolts 45, whereby the straps 37 38 are fastened to the head of the conveyer.

Now what I claim is—

1. In an apparatus of the class described, a conveyer-frame, drums at the ends of the frame, a conveyer-belt traveling over said drums, and a universal joint, said joint comprising a vertically-movable member, a horizontally-movable member, and means for connecting the vertically and horizontally movable members to allow for variable movements substantially as set forth.

2. A portable conveyer for the purpose specified comprising in combination, a trestle-like frame, drums at the ends of the frame, a conveying-belt traveling over said drums, means for tightening the belt, means for adjusting the shafts on the respective end drums, a universal joint, said joint comprising a vertically-movable member, a horizontally-movable member, and means for connecting the vertically and horizontally movable members to allow for variable movements, substantially as set forth.

3. In a portable conveyer, the combination with a belt-carrying frame, drums at the ends of said frame, a conveyer-belt traveling over said drums, means for tightening said belt, means for adjusting the shafts of the respective drums, said means comprising arms bent at right angles at one end, and carrying at their opposite ends boxes, in which the shafts are mounted, said arms having slots securing bolts, said bolts adapted to pass through the slots in the arms, a bearing-lug arranged in alinement with the bent end of the arms, and adjusting-screws seated in said lugs and bent ends, substantially as shown and described.

4. In an apparatus of the class described, a conveyer-frame, drums at the ends of said frame, a conveyer-belt traveling over said drums, a universal joint and a chute suspended from the head of the conveyer by the universal joint, said joint consisting of arms secured to the sides of the frame, a yoke provided with a radial slot hinged to said arms, a pivot-bolt, said bolt pivotally connecting the yoke to the chute, and a pin depending from the chute and passing through the slot in the yoke, said pin guiding the chute in its horizontal oscillatory movement, substantially as set forth.

5. In an apparatus of the class described, the combination with a frame, drums mounted at the ends of said frame, a conveyer-belt traveling over said drums and a device supported in the carrier-frame for tightening the conveyer-belt, consisting of stationary slotted girths, slidable shoes mounted above and below said girths, vertical bolts, the upper and lower shoes being connected by the vertical bolts passing through the slotted girths, bearings mounted on one of the shoes, a shaft, a tightening-drum, said shaft carrying the tightening-drum, converging arms connected to one of the shoes at opposite sides of the frame, a rod threaded on its outer end connected to the converging arms, and passing through a cross-sill of the frame, and a nut working on the threads behind the cross-sill for adjusting the tension of the belt as and for the purpose set forth.

6. In an apparatus of the class described, a conveyer, and a universal joint, said joint comprising a vertically-movable member, a horizontally-movable member, and means for connecting the vertically and horizontally movable members to allow for variable movements, substantially as set forth.

7. In an apparatus of the class described comprising a frame, drums at the ends of said frame, a conveyer-belt traveling over said drums, means for tightening the belt, means for adjusting the shafts of the respective end drums, and a universal joint, said joint comprising stationary supporting-arms, a vertically-movable member hinged to said arms and a horizontal member pivoted to the vertical member, said horizontal member having the chute pivotally connected to it, substantially as described.

8. A portable conveyer, comprising a trestle-like frame, a conveyer-belt, a chute universally suspended from the trestle-like frame, means supporting the chute, drums, means for adjusting the drums, and a brace-rod 42, fixed to the means for supporting the chute and having its upper end bent and threaded into the conveyer-frame, and receiving a nut and washer for clamping said end to the frame, substantially as set forth.

9. A portable conveyer, comprising a trestle-like frame, a belt, drums, means for adjusting the drums, said means consisting of boxes secured to adjustable arms having the opposite ends bent at right angles thereto, a U-shaped frame located adjacent the right-angle portion on said U-shaped frame having an ear, a bolt adjustably connecting the ear and said angular portion, bolts securing the U-shaped frame to the sides of the conveyer and dowel-pins in the ends of the U-shaped frame to retain said frame in a rigid position, substantially as set forth.

In testimony whereof I have hereunto affixed my signature in the presence of two witnesses.

JOHN ANDREW BROWN.

Witnesses:
JAMES REID,
T. J. GEISLER.